United States Patent
Uy et al.

(10) Patent No.: US 9,524,380 B2
(45) Date of Patent: Dec. 20, 2016

(54) SECURE ELEMENT-CENTRIC DIGITAL RIGHTS MANAGEMENT

(71) Applicant: Cellco Partnership, Basking Ridge, NJ (US)

(72) Inventors: Warren Hojilla Uy, Randolph, NJ (US); Taussif Khan, Monroe, NJ (US); Young Rak Choi, Belle Mead, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 164 days.

(21) Appl. No.: 14/143,678

(22) Filed: Dec. 30, 2013

(65) Prior Publication Data

US 2015/0186621 A1    Jul. 2, 2015

(51) Int. Cl.
*H04L 29/06* (2006.01)
*G06F 21/10* (2013.01)

(52) U.S. Cl.
CPC ....... *G06F 21/10* (2013.01); *G06F 2221/0797* (2013.01)

(58) Field of Classification Search
CPC .......... G06F 21/10; G06F 21/24; G06F 21/60; H04L 9/083; H04L 9/32
USPC ...................................... 726/24–29; 713/168
See application file for complete search history.

(56) References Cited

U.S. PATENT DOCUMENTS

| | | | |
|---|---|---|---|
| 7,392,547 B2* | 6/2008 | Cahill | G06F 21/10 705/59 |
| 7,788,493 B2* | 8/2010 | Mononen | G06F 21/335 455/411 |
| 8,171,525 B1* | 5/2012 | Pelly | H04L 9/083 380/277 |
| 8,806,208 B2* | 8/2014 | Cheng | 380/28 |
| 8,874,915 B1* | 10/2014 | Rodoper | H04L 63/061 380/278 |
| 2007/0112680 A1* | 5/2007 | van Niekerk | H04L 63/104 705/57 |
| 2007/0180538 A1* | 8/2007 | Kravitz et al. | 726/33 |
| 2007/0204064 A1* | 8/2007 | Mail et al. | 709/246 |
| 2012/0304312 A1* | 11/2012 | Dong | G06F 9/4443 726/28 |
| 2013/0074163 A1* | 3/2013 | Murakami | G06F 21/10 726/4 |
| 2013/0219507 A1* | 8/2013 | Chang et al. | 726/26 |
| 2013/0227538 A1* | 8/2013 | Maruyama | 717/168 |
| 2013/0310001 A1* | 11/2013 | Midkiff | 455/411 |
| 2015/0049748 A1* | 2/2015 | Ostling | H04W 8/245 370/338 |

\* cited by examiner

*Primary Examiner* — Izunna Okeke
*Assistant Examiner* — Hee Song

(57) ABSTRACT

The examples provided herein relate to digital rights management keys that allow for the presentation of content on output devices of a content presentation device. The examples describe subscriber-specific digital rights management keys that are provided to a subscriber by a mobile network operator instead of a device manufacturer. The digital rights management keys are associated with the subscriber account maintained by the mobile network operator. As a result, the mobile network operator provides the capability to transfer the digital rights management keys between multiple devices because the digital rights management keys are subscriber-specific instead of device-specific.

20 Claims, 7 Drawing Sheets

100

200

400

SECURE ELEMENT-CENTRIC DIGITAL RIGHTS MANAGEMENT

BACKGROUND

It is becoming increasingly common for users to have multiple devices for playing back the various types of digital media content available. Digital media content may be any form of electronic content, such as software applications, videos, movies, images, e-books, digital articles, digital magazines, audio and the like. The digital content may be downloaded content or streaming content. For example, a user may begin watching a video on a tablet computer (e.g. while at home) and wish to continue watching the video on a more portable device such as smartphone (e.g. while commuting to work). Presently, however, digital rights management (DRM) keys are stored on a device, electronic appliances or equipment (e.g. cellphone, TV, media player, etc.) by the device manufacturer, which prevents the content from being presented on another device that does not have the corresponding DRM keys.

In the present paradigm, DRM license providers (e.g. Microsoft™ or Google™) provide licenses and security keys to mobile device manufacturers (e.g. Sony™, Samsung™, etc.), and the device manufacturers generate device-specific DRM keys and store them on the devices. The device manufacturer DRM keys are not removable from the mobile device.

When the mobile device receives digital content (e.g. a movie either a rental or a purchase), a mobile device manufacturer-provided DRM key that is specific to the mobile device is associated with the digital content. When content is provided by a content server, the content is encrypted using a content encryption key. In order to securely deliver both the content and the content encryption key, a public key (which is a DRM key in form of a digital certificate) is used to encrypt the content encryption key. A content player application executing on a mobile device provides the public key to the content service provider by requesting content from content service provider, such as Netflix®.

Before providing the content, the content service provider examines a digital certificate provided by the mobile device. The digital certificate includes a chain of other certificates that "sign" the digital certificate in order to verify the authenticity of the digital certificate provided by the mobile device to the content service provider. The other certificates "sign" the digital certificate by providing a key (e.g. a string of characters/digits) that when used in a process (e.g. a hash) produce an expected result that proves the provider of the key (in this case, the mobile device) is an authorized user. The chain of other certificates are provided by a licensing entity, such as Microsoft®, that signs a certificate for an original equipment manufacturer (OEM), such as Samsung®, which signs a certificate for the respective mobile device (e.g., a Galaxy S4®), that signs the device certificate which is the digital certificate used by the content player application. The device certificate is signed by the chain of other certificates to authenticate to the content service provider server that the request is from a mobile device authorized to receive the content. This chain of other certificates controls the transfer of the DRM keys associated with the content. The above referenced chain of DRM-controlling certificates includes at least two certificates, the OEM certificate and the model certificate, that are associated with the device manufacturer.

Once the content provider server is able to verify that the request is from an authorized mobile device, the content provider server delivers the content. The device certificate provides a private key that is paired with the public key used to encrypt the content provided by the content server. However, as a result, the need for the chain of certificates prevents the DRM keys from being removed from the mobile device. When the digital content is transferred from the first mobile device to a second mobile device, a DRM key that allows the digital content to be presented on the second mobile device is not available on the second mobile device because the manufacturer DRM keys are not transferrable from the first device to the second mobile device. Since each device has device-specific DRM keys for presenting content, transferred content cannot be played on a subsequent device. In other words, the present implementation is a device-centric system, in which the network carriers only passively participate. There are at least two concerns with the present, device-centric implementation. Firstly, DRM keys are stored in a device's memory in a manner that may not provide an adequate level of security; and, secondly, the DRM content can only be played on the specific device that downloaded the content.

Hence, there is a need for a subscriber-centric mechanism that allows DRM keys to be assigned to a user thereby permitting the DRM keys to be transferable from one device to another. A subscriber-centric implementation in which network carriers take a more active role in the distribution and management of DRM keys would advantageously improve security and content portability.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
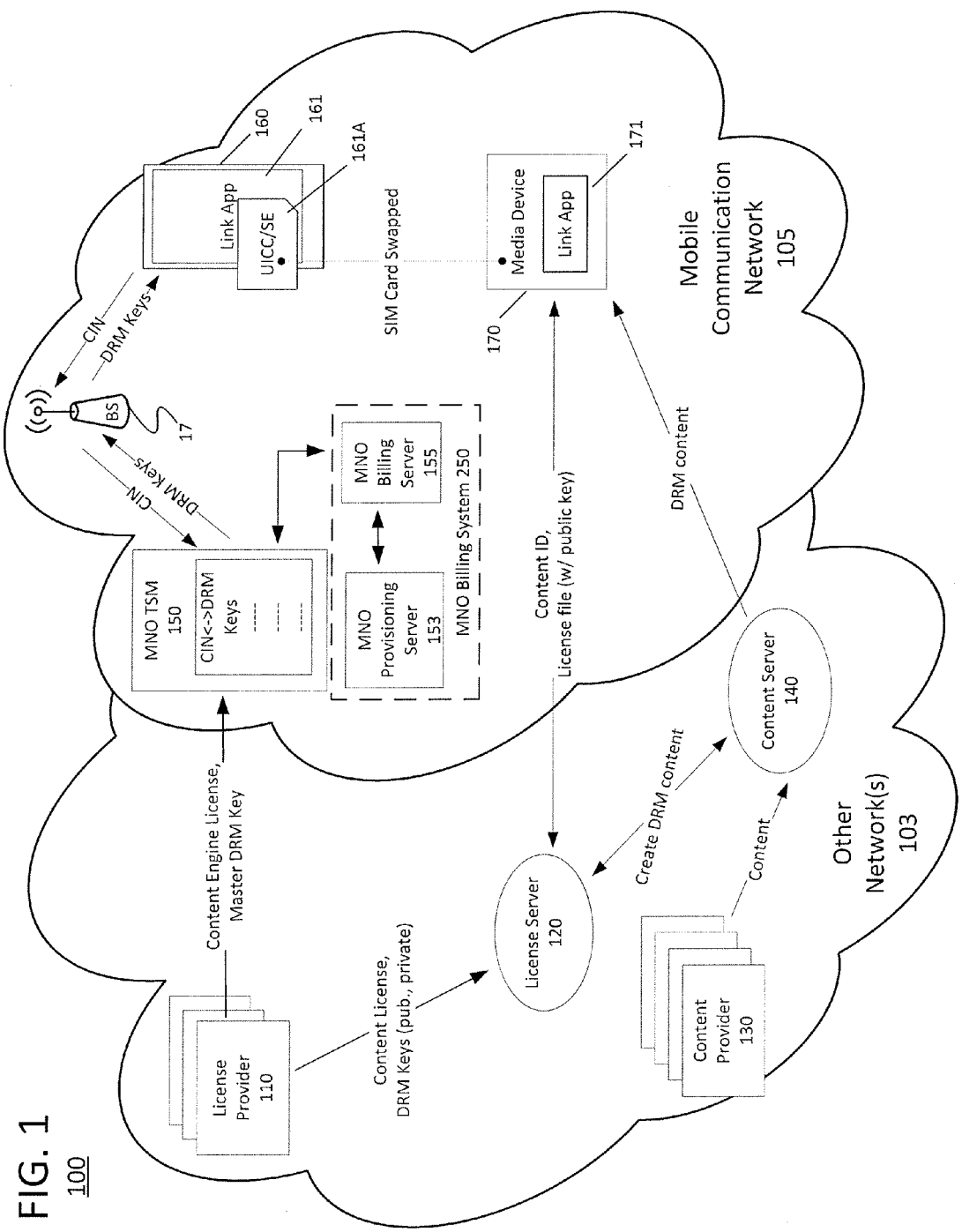
FIG. 1 is a high-level functional block diagram of an example of a system of networks/devices that provide various communications for a mobile device and support an example of a subscriber-centric content digital rights management service.

In the following detailed description, numerous specific details are set forth by way of examples in order to provide a thorough understanding of the relevant teachings. However, it should be apparent that the present teachings might be practiced without such details. In other instances, well known methods, procedures, components, and/or circuitry have been described at a relatively high-level, without detail, in order to avoid unnecessarily obscuring aspects of the present teachings.

In the present examples, the term "content" refers to information in the form of digital media content, such as videos, movies, images, e-books, digital articles, digital magazines, audio and the like, that is protectable by a digital rights management system. Digital rights management entails a one or more services, such as encryption, tracking and other services for protecting the digital media content from unauthorized use. Content may be obtained from a multitude of content providers, such as video game developers, electronic reading material publishers (e.g. Penguin® or Wall Street Journal®), cable television companies (e.g. Comcast® and Verizon®), on-line retailers (e.g. Amazon®), movie studios (e.g. Universal Studios®), cable channels (e.g. HBO® or Cinemax®), software providers and the like.

An increasing amount of content is being presented on mobile devices through the systems of mobile network operators (MNO). An MNO is a cellular communication carrier that provides cellular network communications (i.e. voice and data communications) to mobile devices. In addition to being cellular communication carriers, an MNO may also be a content provider or closely associated with one or more content providers. A number of the content providers also provide proprietary computer applications (i.e. "link applications" that may or may not include related secure "link application applets" (i.e. a content key application)) for purchasing, borrowing (without a fee), and renting content from the respective content provider. In addition, third party vendors' applications, such as the Media Hub® media player, Microsoft Windows Media Player 12® or a mobile device manufacturer media player, may also be used to present content associated with one or more of the content providers. The third party vendors' media player applications may or may not include a secure applet similar to the link application applets provided with the content provider proprietary computer applications. Each link or media player application, whether provided by the content provider or by the third party vendor, may be provided with a digital rights management key usable by the respective link or media player application for accessing DRM protected content. In some instances, the DRM protected content may be provided by the respective content provider that supplied the respective link or media player application. For example, a Netflix® application may need only a single DRM key to access (i.e. decrypt and/or authenticate the application) any DRM protected content obtained via the Netflix® application from Netflix®. Similarly, the HBO Go® application presents content provided by HBO® and a mobile device may need only a single DRM key associated with the application and the content provided by HBO®. A mobile device may need only a single DRM key to be associated with the application and the content provided by HBO® in order to present the content on the mobile device.

Examples of the described subscription-centric solution are based on the subscriber's identity. So, instead of storing digital rights management (DRM) keys on a memory permanently installed in the subscriber's device, DRM keys are stored on a secure element that contains information related to the subscriber as well as the content. The disclosed examples provide the advantage of allowing a mobile device subscriber to transfer DRM keys related to the subscriber's content (downloaded or streaming) from one device to another device without having the concern of whether a device has the appropriate DRM keys for presenting the subscriber's content.

A secure element (SE) operates independently from the rest of the mobile device and includes at least a processor and a secure memory protected by security keys and other protections, such as a personal identification number. For example, an SE is a self-contained system including a dedicated processor and memory that are protected by one or more security layers implemented using hardware and software encryption techniques that prevent, for example, access to secured computer applications, personal account, subscriber account, financial account, security keys, such as DRM keys, and other information in the secure element memory.

The SE processor stores and accesses the information stored in the SE memory. The SE processor is communicatively coupled to the mobile device processor, and responds to requests from the mobile device processor. The SE may also control access to an universal integrated circuit card (UICC) from applications executing on the mobile device processor as well as any external applications/programs attempting to access the UICC from an external server not associated with the mobile network operator. The SE embedded in the device will shield the UICC from being accessed by users or others who may be bad actors.

The SE may be configured in various ways. For example, an SE may be embedded in a mobile device, or may be either integrated (i.e. embedded) in an UICC or into a secure digital card (e.g. a miniSD or a microSD card) that may be inserted into and removed from the mobile device. For example, the UICC or the microSD of the mobile device may be configured as secure element and may be removable from the mobile device. The UICC may include a central processing unit, input and output circuits, and different types of memory such as ROM, RAM, and EEPROM. Any data stored via the SE on the UICC is not accessible by a user or a user device processor without passing through the security layers presented by the SE. The following discussion will refer to the UICC as having an integrated SE, but it should be understood that, for example, a microSD with an integrated SE may operate in substantially the same manner as described. For ease of explanation, the UICC will be referred to in the following discussion, but the following discussion applies to a microSD with an integrated SE as well.

The SE identifies the subscriber using, for example, a card identification number (CIN) that uniquely identifies a UICC of a mobile device. Alternatively, another identifier obtained from a secure element embedded the mobile device may be provided to the mobile network operator (MNO) trusted service manager (TSM) for insuring the correct DRM keys are provided to the requesting subscriber device. The advantage of this mechanism is that the user can view DRM contents on any supported appliances (e.g. a tablet, a television, an audio system and/or the like) as long as the user couples (e.g. inserts into a proper port or reader associated with the supported appliance) the UICC having the appropriate DRM keys and subscription to the supported appliance. For example, the user removes (i.e. uncouples) the secure element or UICC from a first device, such as mobile device, and inserts (i.e. couples) the secure element or UICC into a supported appliance. A supported appliance may be a tablet, audio device (e.g. MP3 player), video player (e.g. Internet-capable DVD player), gaming device, set-top box, media box, television, laptop or the like. Using the DRM keys on the secure element or UICC, the supported appliance is able to download or stream the content that was playable on the device.

Reference now is made in detail to the examples illustrated in the accompanying drawings and discussed below. FIG. 1 is a high-level functional block diagram of an example of a system of networks/devices that provide various communications for a mobile device and support an example of a subscriber-centric content digital rights management service. In the system 100, a number of different, networked components, such as servers and mobile devices, interact to facilitate the presentation of licensed content on a mobile device. For example, components within other network(s) 103 and a mobile communication network 105 may exchange data in order to provide the licensed content to a mobile device 160 or media device that subscribe to mobile communication network.

Examples of the digital rights management service that are provided by the mobile network operator (MNO) that operates network 105 will now be described in more detail. The network 105 allows users of the mobile devices such as 13 (and other mobile devices not shown) to initiate and receive telephone calls to each other as well as through the public switched telephone network (not shown). The network 105 typically offers a variety of data services via the Internet (part of the other network 103), such as downloads of DRM-protected content, web browsing, email, etc. The mobile communication network 105 will provide similar communications for many other similar users as well as for mobile devices/users that do not participate in the subscriber-centric content digital rights management service. The mobile communication network 105 provides mobile wireless communications services to those devices as well as to other mobile devices (not shown), for example, via a number of base devices (BSs) 17. The wireless mobile communication network 15 might be implemented as a network conforming to the Long Term Evolution (LTE) standard, the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile communication network 105 can be implemented by a number of interconnected networks. Hence, the mobile communication network 105 may include a number of radio access networks (RANs), as well as regional ground networks interconnecting a number of RANs and a wide area network (WAN) interconnecting the regional ground networks to core network elements. A regional portion of the network 105, such as that serving mobile device 160, can include one or more RANs and a regional circuit and/or packet switched network and associated signaling network facilities.

Physical elements of a RAN operated by one of the mobile service providers or carriers include a number of base devices represented in the example by the base devices (BSs) 17. Although not separately shown, such a base device 17 can include a base transceiver system (BTS), which can communicate via an antennae system at the site of a base device and over an airlink with one or more of the mobile device 160 or media device 170, when the devices are within range. Each base device 17 can include a BTS coupled to several antennae mounted on a radio tower within a coverage area often referred to as a "cell." The BTS is the part of the radio network that sends and receives RF signals to/from the mobile device 13 that are served by the base device 17.

The present techniques may be implemented in any of a variety of available mobile networks 105 and/or on any type of mobile device compatible with such a network 105, and the drawing shows only a very simplified example of a few relevant elements of the network 105 for purposes of discussion here. The mobile network operator (MNO) is a cellular service provider that provides voice and data communication services to devices, such as mobile device 160 and media device 170 through the mobile communication network. The mobile communication network 105 includes, among other components, a number of servers and other equipment that facilitates the delivery of content, such as a mobile network operator (MNO) billing system 250, a MNO trusted service manager (TSM) 150, and communication equipment, such as base station (BS) 17.

The mobile communication network 105 can also include other elements that support functionality other than device-to-device media transfer services such as messaging service messages and voice communications. Specific elements of the mobile communication network 105 for carrying the voice and data traffic and for controlling various aspects of the calls or sessions through the network 105 are omitted here form simplicity. It will be understood that the various network elements can communicate with each other and other aspects of the mobile communications network 105 and other networks 103 (e.g., the public switched telephone network (PSTN) and the Internet) either directly or indirectly.

The other network(s) 103 also may include a number of servers that provide different functions for managing digital rights for content providers. For example, license provider 110 may be a server provided by a third-party, such as Microsoft® or Google® that manages the licensing of different parties, such as individuals, media service providers (e.g. Netflix® or Amazon®) and the like. Other servers, such license server 120, interact with the license provider server 110 and the MNO trusted service manager (TSM) 150, and the content provider server 130 to provide licensed DRM protected content to the content server 140. The content server interacts with the license server 120 to provide licensed content to the mobile device 160 and device/appliance 170.

Figure 7:
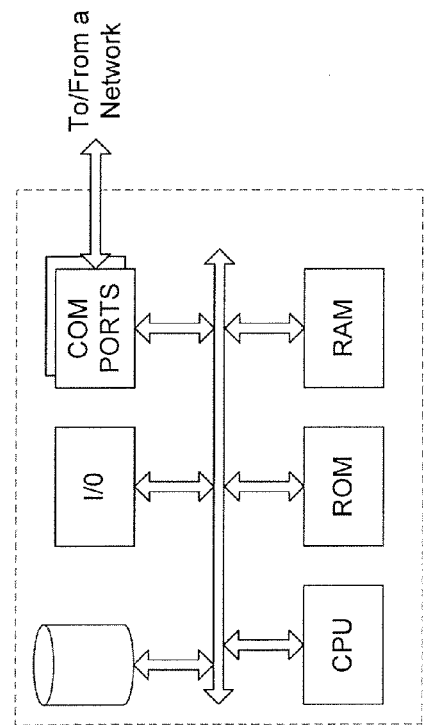
FIG. 7 is a simplified functional block diagram of a computer that may be configured as a host or server, for example, to function as the content provider or license provider in the system of FIG. 1.
Figure 8:
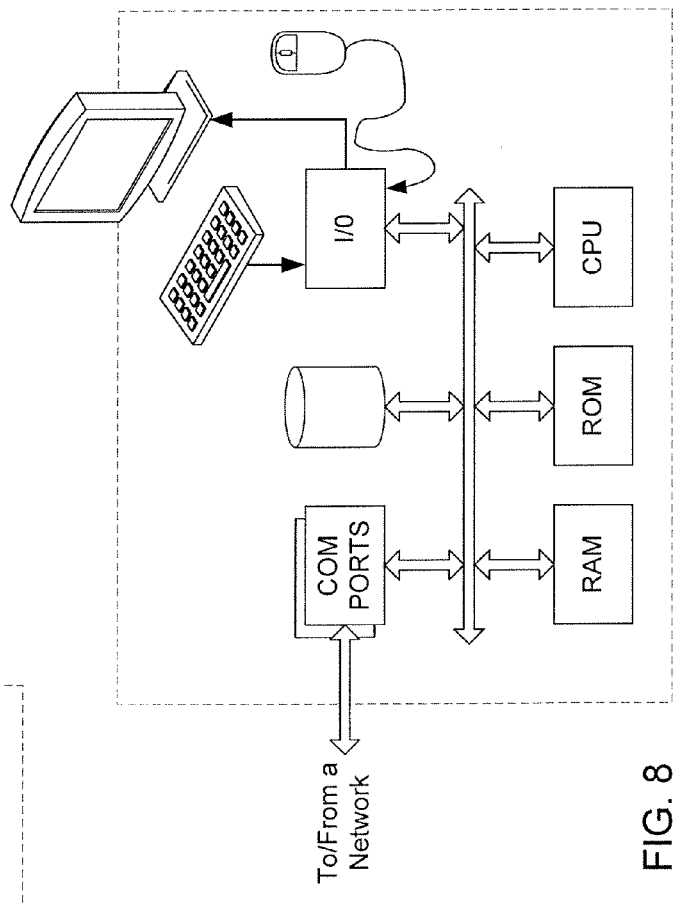
FIG. 8 is a simplified functional block diagram of a laptop computer, media box or other media presentation device or appliance.

Each of the servers, in the example, includes a data communication interface for packet data communication. Each of the servers also includes a central processing unit (CPU), in the form of one or more processors, for executing program instructions. A server platform typically includes an internal communication bus, program storage and data storage for various data files to be processed and/or communicated by the server, although the server often receives programming and data via network communications. Examples of such platforms are shown in FIGS. 7 and 8. The hardware elements, operating systems and programming languages of such servers are conventional in nature. Of course, the server functions may be implemented in a distributed fashion on a number of similar platforms, to distribute the processing load.

Different from the certificate chain in the existing DRM architecture described above, the described examples provide a certificate chain that does not rely on the original equipment manufacturer to provide or generates certificates. In this example, when a mobile device 160 user requests content from the content server, the license provider 110, the MNO TSM 150 and the SE 161A on the mobile device 160 each provide a certificate to authenticate themselves. Each certificate includes a key that can be used to verify or authenticate the certificate as being provided by an authorized entity or device. In the example, a license provider, which is a trusted licensing entity, such as Microsoft®, provides certificates that are used to "sign" a number of certificates for the MNO TSM to provide to a secure element. The chain of certificates are used to authenticate the identity of the requesting device, as well as providing public content keys that are used to encrypt the requested content. In the described examples is provided a certificate chain that follows from the license provider certificate, such as a Microsoft® certificate, that is used to sign an MNO certificate, which is used by the MNO TSM to sign a secure element certificate that is stored in the secure element of the UICC in the mobile device. The described certificate chain does not rely upon the original equipment manager to provide a certificate or on a model certificate that are specific to the particular mobile device. As a result, the described certificate chain allows the content DRM keys to be specific to the mobile device subscriber.

In an example of the operation of the system 100, the license provider 110 provides a content license to a license server 120. The license server 120 may be a server that manages content licenses sent by the different license providers 110. The license server 120 communicates with a content server 140 to create DRM protected content. For example, the content provider 130 provides content to the content server 140, which associates a content identifier (ID) with the content. The content server 140 forwards a request, which contains the content ID, for a content key to the license server 120. The license server 120 associates a content key (i.e. a license) with the content identified via the content ID by the content server 140 to provide licensed (i.e. DRM protected) content. The license server 120 provides the content key to the content server 140 in response to the request. Conversely, the content server 140 may associate the content with a content license (i.e. content key) identified and provided by the license server 120. The content server 140 upon receipt of the content key creates the DRM protected content by encrypting the content using the provided content key, and also encrypts the content key. The content server stores the licensed content in a licensed content file that includes a content identifier and the encrypted content key. Generally, when a mobile device subscriber purchases, rents, borrows, or otherwise obtains content through an on-line store or other entity, the licensed content is provided by the content server 140 to the device, such as media device 170, in the licensed content file. In response to receiving the licensed content file, the media device 170 requests from the license server 120 the content key associated with the content ID. The device/appliance 170 request includes the content ID and the SE certificate that includes a public encryption key. The license server 120, in response to the request by the device/appliance 170, provides the license with an encrypted content key. The encrypted content key is encrypted using the public key provided with the SE certificate. Upon receipt of the encrypted content key, the SE enables decryption of the content key, which is used to decrypt the content. The link application 171 causes the content to be presented on the media device 170.

To insure that the content delivery application service offered by the content server 140 is available to only authorized devices/users, the provider of the application service also deploys an authentication server (not shown). The authentication server could be a separate physical server as shown, or authentication server could be implemented as another program module running on the same hardware platform as the content server application 140. Essentially, when the content server application 140 receives a service request from a client application, such as link application 161, on a mobile device 160, the content server application provides appropriate information to the authentication server to allow server application to authenticate the mobile device 160 according to known authentication protocols. Upon successful authentication, the authentication server informs the content server application 140, which in turn provides access to the service via data communication through the various communication elements (e.g. 17) of the network 105 and the other network(s) 103. A similar authentication function may be provided for subscriber-specific DRM-protected content delivery service(s) offered via the MNO TSM 150 and the MNO billing system 250.

In addition, the client applications may also receive DRM license-related information from another server, such as server 25 or 27. For example, at some time (e.g. before, after or contemporaneously) when obtaining content from the subscriber-specific DRM-protected content delivery service, which may or may not be associated with the client, such as link application 161, the client application also requests license information from a server, such as license server 120. The requested license information may include a content identification of the DRM protected content and a public DRM encryption key of the identified content. The client application has the encrypted content and the license file information, which when combined with the subscriber-specific DRM keys maintained by the secure element of the mobile device 13, allows the client application to be presented on an output device of the mobile device 13.

Returning to the discussion of the license provider 110, the license provider (e.g. Microsoft™) 110 also provides a content engine license and one or more related security key(s) to the mobile network operator (MNO) that includes at least MNO TSM 150 and MNO Billing System 250. The MNO Billing system may include, for example, MNO provisioning server 153 and MNO Billing server 155. The MNO provisioning server 153 may be configured to provide provisioning services to mobile devices that are joining the mobile network implemented by the MNO. The MNO billing server 155 may be configured to charge the provisioned mobile devices for services (e.g. voice and data communications, providing content and the like) rendered by the MNO. The content license engine is a software module provided by the respective content providers that is configured to generate a number of DRM keys for assignment to the various subscribers by the respective MNO. The content license engine generated-DRM keys are included in certificates that the MNO generates for the MNO subscriber devices. The content license engine may have a separate master license that is used by the content license engine to generate multiple content-specific or content provider-specific licenses related to content provided by the content provider. For example, a content-specific license may be a license for specific content, such as a specific song, book or movie, while a content provider-specific license may be a single license for all of the types of content (e.g. all the movies available from the content provider) provided by a content provider.

Regardless of the type of license provided by the content provider to the MNO, the MNO 150 TSM generates DRM keys based on the type of license and related information, such as a master key, for distribution to mobile devices 160 requesting presentation of the respective content. The database of generated DRM keys and distribution of the generated DRM keys may be managed by the trusted service manager (TSM) of the MNO 150. The MNO TSM 150 populates a database with the DRM keys associated with the content provider licenses. A TSM, in some implementations, is a secured software module that provides authentication and other related information to mobile devices that are provided services by the MNO.

In the present example, the mobile device 160 is equipped with a UICC/SE 161A. A UICC may have various configurations, and typically, contains serial numbers unique to the UICC (i.e. an Integrated Circuit Card Identifier (ICCID)), an international mobile subscriber identity (IMSI), security authentication and ciphering information, temporary information related to the local network, a list of the services the user has access to and at least two passwords: a personal identification number (PIN) for ordinary use and a personal unblocking code (PUK) for PIN unlocking.

The mobile device 160 used in the subscriber-centric DRM-protected content delivery and digital rights management services also can receive and execute applications written in various programming languages, as discussed in more detail below. The mobile device 160 via the link application 161 may obtain DRM protected content from the content server 140. For example, the obtained content may be provided in a content file containing a content identifier (ID) and license file containing public key information related to the content. The content may be stored on the device 160 in an encrypted file, and may only be decrypted using the keys obtained from the license file and a DRM key provided by the MNO TSM 150. Alternatively, the content presented on the device 160 may be streaming content that is streamed from a content server, and the DRM key may be needed by the content server prior to and/or during the streaming of the content to the device 160. In order to present the content on the mobile device 160, the mobile device 160 needs a private key associated with the public key information provided with the content to decrypt the licensed content. To obtain the private key related to the content from the MNO 150 TSM, the mobile device 160 may launch a link application 161 that may be associated with the content provider (i.e. an application "linked" to the content provider) or may be a media player application, such as Media Hub® media player or Microsoft Windows Media Player 12®, that is included with the mobile device from the mobile device manufacturer, or may be provided a third party.

The link application 161 may be used for both obtaining (e.g. by purchasing) and presenting the obtained content. For example, the link application 161 may provide user interfaces for browsing content, selecting content for purchase or rent from the content provider, for presenting the content, and controlling the presentation of the content on the mobile device 160. The link application 161 may also have a secure "companion applet," which may be stored in a memory, such as in the UICC 161A, controlled by the secure element and executed by the secure element (SE) processor. The link companion applet (not shown), which may be associated with the link application, may include secure information such as credit card information or other personal information. The link companion applet executes on the SE processor, and connects with the MNO 150 TSM via the wireless communication of the mobile device 160. The launched link application, the link companion applet or a combination of both (e.g. link application may send an initial request and the link companion application may send a follow-up request with secured information) may send a request for the DRM keys of the content to the MNO 150 TSM. In the request, the mobile device 160 provides an identifier such as a card identification number (CIN). The CIN uniquely identifies the UICC of the mobile device 160, to the MNO 150. In response to receiving the CIN of the mobile device 160, the MNO 150 TSM may authenticate the mobile device 160, the link application 161 and/or link companion applet. In response to a success authentication of the mobile device 160, the link application 161 and/or link companion applet, the MNO TSM 150 generates, or updates, a record in a database that cross-references the CIN of the mobile device 160 with the DRM keys provided to the mobile device 160. Upon successful authentication of the link companion application and the mobile device 160, the MNO 150 TSM generates DRM keys, stores the DRM keys in a connected data storage, and distributes the DRM keys to the link companion applet using, for example, known data transmission protocols, such as a bearer independent protocol (BIP) to the mobile device 160. The communications exchanged according to the BIP comply with standards (i.e. Global Platform Card Specification Versions 2.1.1 and 2.2) for securing communications between external servers and networks and the UICC of the mobile device 160. The DRM keys may be received by the mobile device 160 and be provided to the SE processor in the UICC/SE 161A for storage in secure memory managed by the SE processor.

The UICC/SE 161A in the example is removable from the mobile device 160, and may be transferred to other devices, such as device 170, by inserting the UICC/SE 161A into an appropriate port of the device 170.

After purchasing or otherwise requesting the delivery (e.g. when requesting presentation of the content) of the DRM protected content, the mobile device 160 via a cellular transceiver may receive content from a content provider via communication channel established by the mobile device processor with a wireless communication network. The mobile device processor may also launch a link application 161 (e.g. a media player application) for presenting the content on an output device (e.g. a display device, audio speaker or a connected device, such as headphones or television, or a combination of devices) of the mobile device.

Alternatively, the media player application may be a link application 161, which is an application provided by content provider (e.g. Netflix™) that presents digital media content on an output device or devices (not shown) of the mobile device 160. The link application 161 or media player applications may also include a secure link companion applet that is stored in and executed in the secure element of the mobile device 160. As mentioned previously, the media player application may be an application used to purchase the content, or may be provided by the mobile device manufacturer, or a third party, such as an application developer. The link application 161 via the mobile device processor may establish a wireless communication connection (e.g. a cellular communication path) with an MNO 150 TSM for receiving DRM keys associated with the content provider 110 associated with the link application 161 (e.g. Netflix®)

and the DRM-protected content provided by the content provider 110. The link applications 161 executing on the mobile device may store or process information associated with DRM keys, the mobile device (e.g. device ID), the mobile device subscriber, a mobile subscriber integrated services digital network-number (MSISDN) (i.e. mobile device number (MDN)), and/or mobile network operator (MNO), as well as payment information. Some of this information may be stored on a server (not shown), a mobile device 160, and/or the UICC/SE 161A. For example, in response to a selection of content for presentation received on an input device of the mobile device 160, the media player application (or link application 161) may begin executing on the mobile device 160 processor, and obtain from a secure element (SE) processor of the mobile device 160 a DRM key associated with the selected content to be presented. If the DRM key is not available (e.g. not provided at time of purchase or this is the first time the content is to be presented, the DRM keys have an expiration date, the subscriber changed devices), the link companion applet in the SE requests DRM keys for the content to be presented from MNO 150 TSM. Once received, the requested DRM keys are used for decrypting the DRM content by the link or media player application.

Advantageously, by maintaining the DRM keys on the UICC/SE 161A, a subscriber has portability of the DRM keys associated with content owned, or otherwise, under control of the subscriber, so when accessing licensed content, the UICC/SE 161A provides the DRM keys for use by the player application that is going to present the licensed content on a user device 170 in which the UICC is inserted. For example, the UICC/SE 161A may be transferred to another device 170, such as another mobile device, a tablet, a media box, a set-top box, a gaming console, or the like. Since the DRM keys are subscriber-centric, the transferred UICC/SE 161A contains all or a portion of the information needed to allow presentation of the content on the other device.

For example, upon transfer of the UICC/SE 161A to the device 170, a user requests, via an input device on the device 170, content to be presented on an output device of the device 170. In response to the user input via a user interface element, a link application (e.g. provided by Netflix™, HBO Go™, Amazon Prime™ or the like) for delivering content launches on the device 170 a link application 171. The link application 171 executing on device 170 may be similar to the link application 161 executing on the mobile device 160. The launched link application on device 170 requests DRM keys from the SE. The SE accesses secure memory of the UICC/SE 161A and delivers the DRM keys to the link application 171 executing on the device 170. The link application 171 authenticates the subscriber based on the DRM keys. After successful authentication by the link application, the content is delivered to the device 170, which may present the content on an output device of the mobile device 170.

Figure 2:
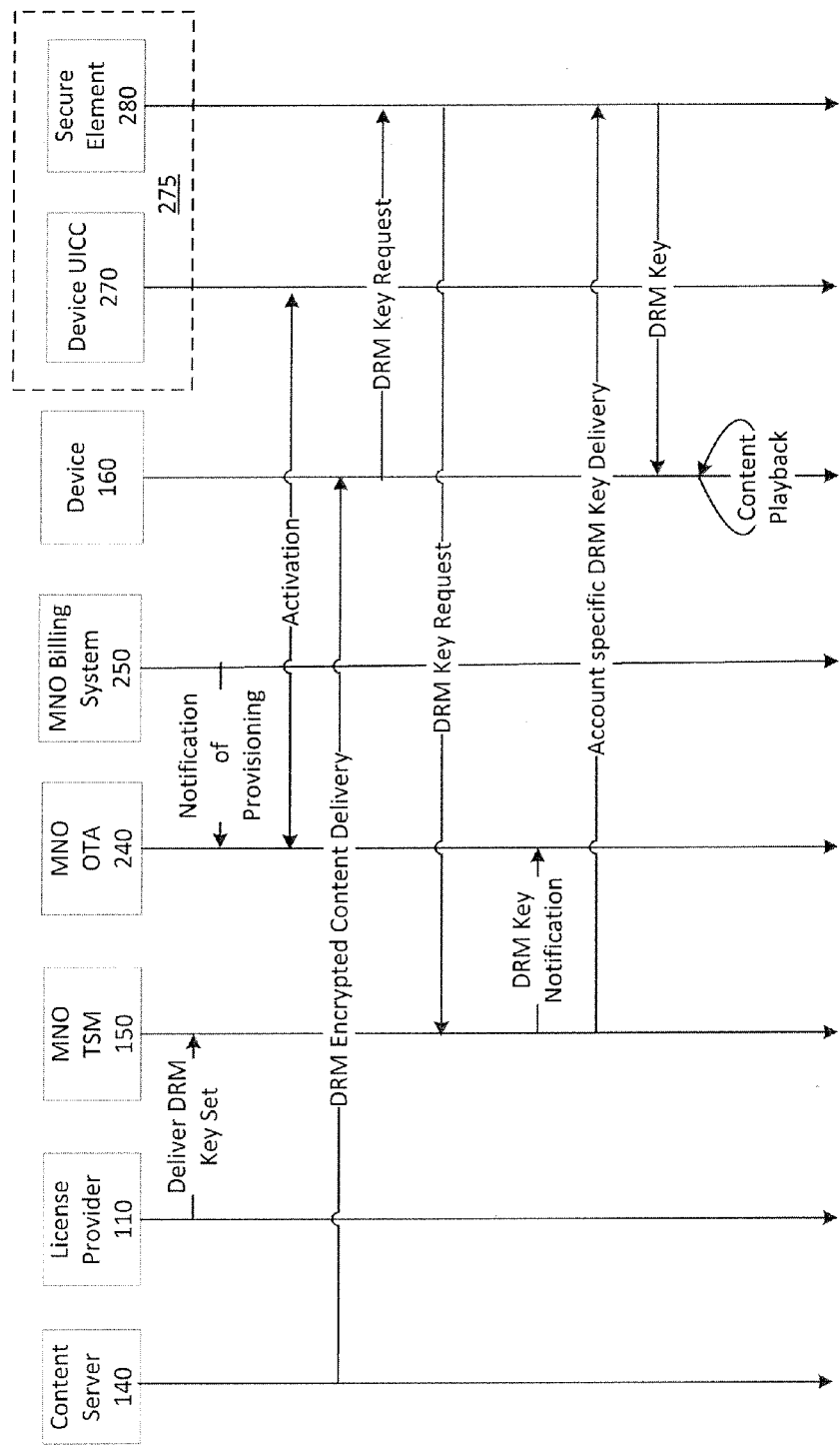
FIG. 2 is a signal flow diagram of an example of an implementation of a subscriber-centric content digital rights management service.
Figure 3:
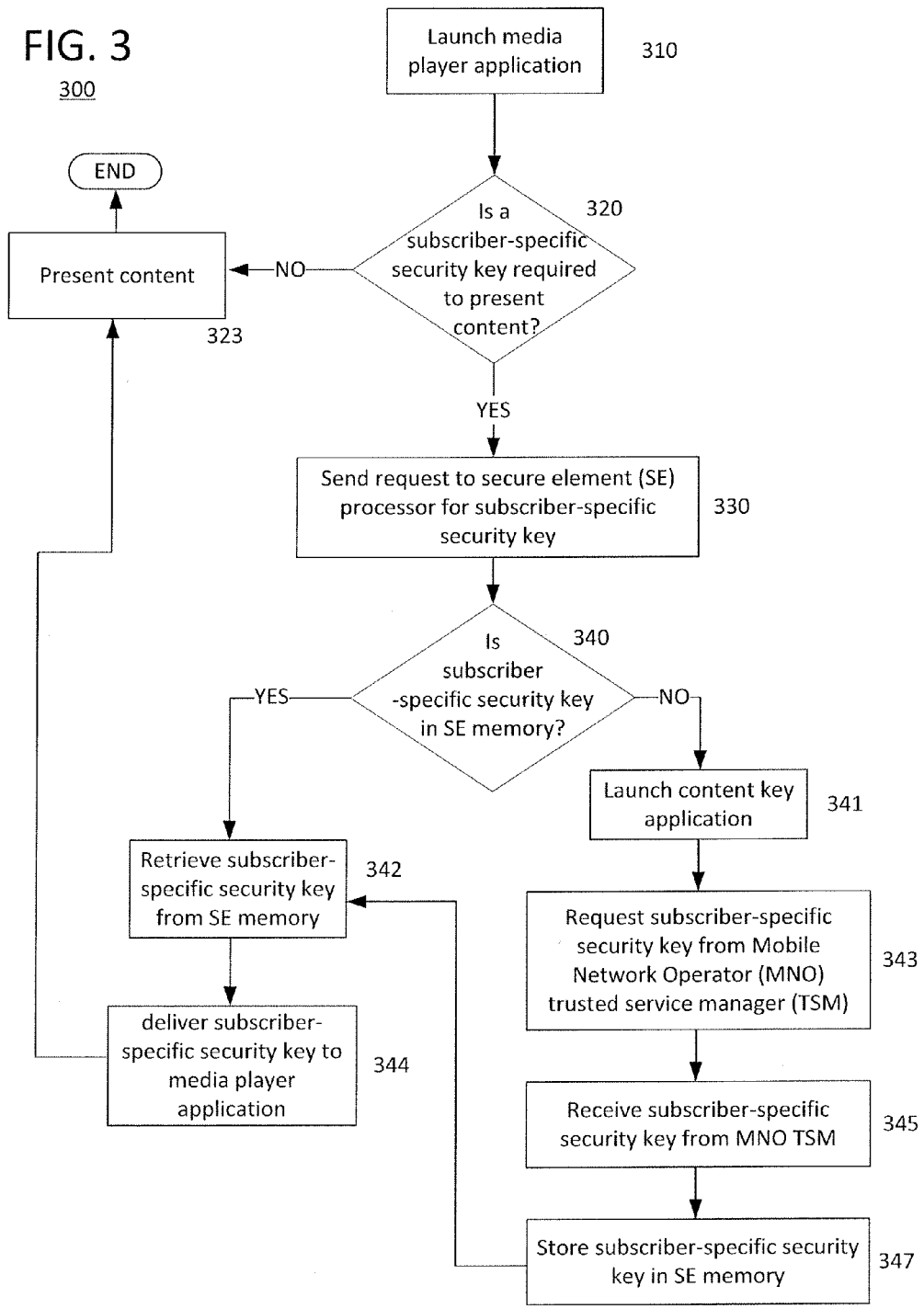
FIG. 3 is a flowchart of an example of using the subscriber-centric content digital rights management service to present secured content on a mobile device.
Figure 4:
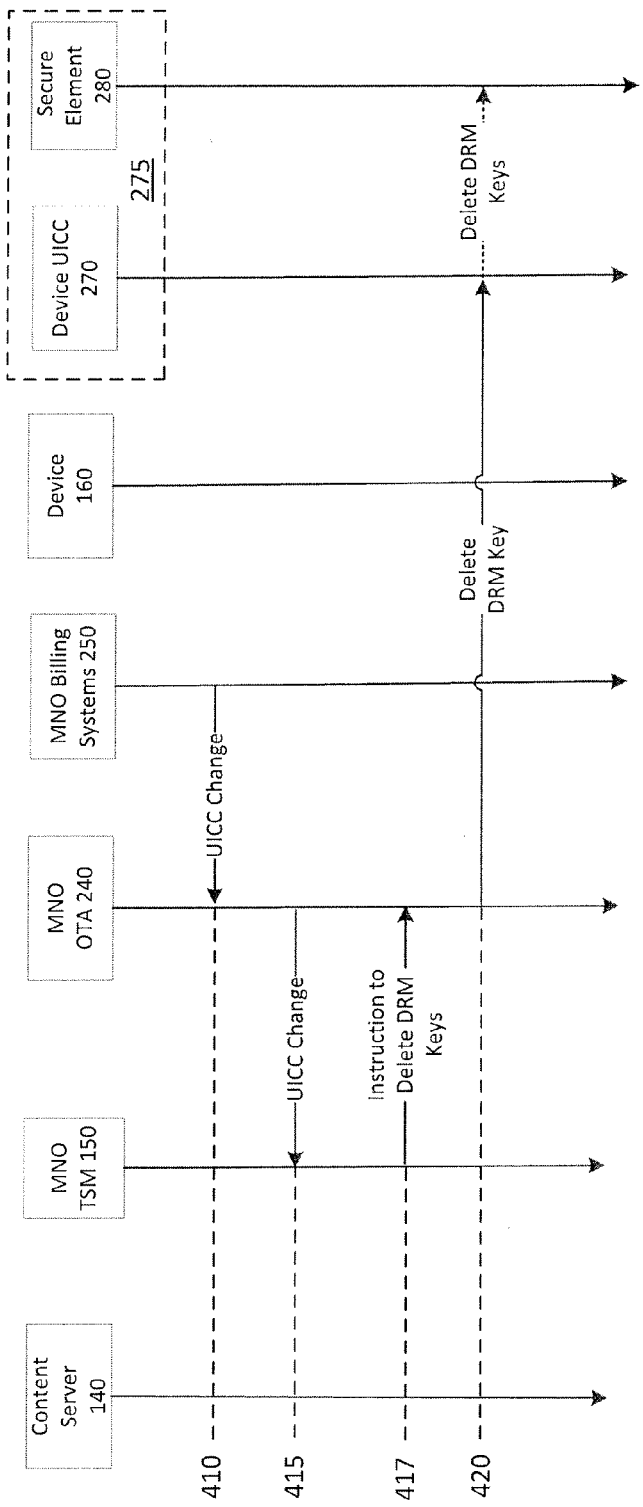
FIG. 4 is a signal flow diagram of an example for maintaining DRM security keys for a subscriber when subscriber equipment is changed in an implementation of a subscriber-centric content digital rights management service.

Different examples shown in FIGS. 2-4 may be implemented for providing the subscriber-centric content digital rights management service. FIG. 2 is a signal flow diagram of an example of an implementation of a subscriber-centric content digital rights management service. As mentioned above, license provider 110 provides content licenses and related DRM keys to a trusted service manager (TSM) of mobile network operator (MNO) 150, instead of, or in addition to, providing licenses and related DRM keys to a mobile device manufacturer.

For example, when a new customer purchases a mobile device, the MNO that is providing services (e.g. voice, data and other services) to the device provisions the new customer as a subscriber of the MNO services in an MNO billing system so the new subscriber may be charged for the services. Once the new customer is provisioned as a subscriber into the billing system 250, the billing system sends a notification to an MNO over-the-air (OTA) service 240 that executes a provisioning service that configures the mobile device of the subscriber for receiving services according to the subscriber's service plan and account. The notification may include an identifier of the mobile device, an identifier associated with the device UICC 270, such as a CIN, on the mobile device and other information needed to provide the subscription services. The MNO OTA 240 activates the mobile device by accessing the device UICC 270 and providing the provisioning information that informs the device 160 of the capabilities and capacities of network services that will be provided by the MNO via a wireless communication path provided by the MNO.

Note while discussed separately in the following discussion of FIGS. 2 and 4, the device UICC 270 and the secure element 280 may be configured as a single removable component 275 within the device 160. For example, the secure element 280 may be incorporated into the device UICC 270, or may be embedded into the device 160 as a separate component that communicates with the device UICC 270. In the case of the secure element being embedded in the device 160, the device UICC 270 is removable from the device 160. In whichever configuration is implemented, the subscriber-specific DRM keys are transferable from the device 160 to another media device, such as 170.

After a period of time, the device 160, in response to a user input, may request content from a content server 140 via a link or media player application launched on the device 160. In response to a request for the selected content transmitted by the device 160 via a wireless radio network communication path, the content server 140 may deliver licensed DRM-protected content to the device 160. In response to receiving a content ID or some other form of identifier of the content selected for presentation, the link application or media player application requests DRM keys related to the requested content from a secure element 280 of the device 160. However, the DRM keys related to the particular content or content provider may not be present in a secure memory accessible by only the secure element 280. In response to the DRM keys related to the content not being present in the secure element 280 memory, a processor in the secure element 280 may launch a secure link companion applet that generates and forwards a secure (i.e. encrypted) request for a DRM key related to the requested content to the MNO TSM 150. The MNO TSM 150 generates a notification that is forwarded to the MNO OTA 240, and forwards subscriber-specific DRM keys to the device's 160 secure element 280.

Subscriber-specific DRM keys are keys provided by a license provider, such as license provider 110, to the MNO trusted service manager (TSM) for distribution to individual subscribers. Each content file containing encrypted DRM protected content is associated with an individual DRM key that is provided to a single, specific subscriber. As a result, the DRM key provided by the MNO TSM 150 is associated with a specific subscriber and the specific subscriber's account.

The secure element 280 executes a link companion application applet that forwards the requested DRM key to the device's 160 link application or media player application for decryption and playback of the content.

FIG. 3 is a flowchart of an example of using the subscriber-centric content digital rights management service to present secured content on a mobile device. This is an example of the process 300 performed by the device 160 when attempting to present content. In this example, a user inputs, via a user input device (e.g. a graphical user interface), a request for content or selects a control in a graphical user interface for opening a media player or link application on the device 160. In response, the link or media player application is launched (310). A user selects, for example, via a graphical user interface content for presentation. Upon selection of the content, a determination is made whether the content requires a subscriber-specific security key to present the content (320).

The selected content may be unlicensed or licensed content. When unlicensed content is obtained, a security key is unnecessary, so the content can be played by the media player application. So in the case of obtaining unlicensed content, the determination, at step 320, results in a "NO" determination, and the process 300 proceeds to step 323 and the content is presented on a output device of the device 160. For example, if the content is an unlicensed video, the video is presented on a display of the device 160 and any audio associated with the video is output on speakers of, or coupled to, the device 160.

Conversely, when obtaining licensed content, at least two files are provided: a content file and a license file. The content file contains encrypted content, and the license file, which is also encrypted, includes a key for decrypting the encrypted content in the content file as well as other information, such as usage restriction information (e.g. content can be played 10×, played for 48 hours after start, must be played within 1 week of download and the like), URLs for obtaining player applications, and the like.

In the case of licensed content, the determination, at step 320, results in a "YES" determination, and the process 300 proceeds to step 330. At step 330, the link or media player application causes the device 160 to send a request to a secure element (SE) processor (not shown) of the mobile device for the subscriber-specific security key related to the requested content. The request may include a content identifier (ID) that identifies the content, and that can be used by the SE processor to search for subscriber-specific DRM keys associated with the content. The SE processor begins scanning the secure element memory for the appropriate subscriber-specific security key related to the requested content. The SE processor analyzes a plurality of security keys stored in the secure element memory to determine whether the subscriber-specific security key is in the secure element memory (340).

If the determination is "YES," the subscriber-specific security key is in the SE memory; the subscriber-specific security key is retrieved from the SE memory by the SE processor (342) and is delivered to the media player application (344). The media player application uses the delivered subscriber-specific security key to decrypt the license file to obtain the content decryption key for decrypting the content in the content file.

Otherwise, if the determination at 340 is "NO," the subscriber-specific security key is not in the SE memory; the SE processor may launch a content key application (e.g. a link companion application applet) for retrieving the subscriber-specific security keys (341). The launched content key application generates control signals that cause the SE processor to generate a request for the subscriber-specific security key that is transmitted to the MNO TSM 150 (343). The request may include a subscriber identifier, a content identifier and/or other information The MNO TSM 150 communicating via a bearer independent protocol sends the requested subscriber-specific security key to the device 160, which receives the requested subscriber-specific security key (345). The bearer independent protocol is a faster alternative (e.g. to SMS bearer) for over-the-air (OTA) servers to access and upgrade contents and applications in an UICC. The bearer independent protocol also provides secure administration by supporting secure HTTP, or HTTPS, as per GlobalPlatform 2.2 Amendment B. Specifically, a UICC utilizes class 'e' proactive commands of ETSI TS 102 223 to support the bearer independent protocol. The requested subscriber-specific security key is stored in the SE memory (347) by the SE processor. The content key application executed by the SE processor retrieves the requested subscriber-specific security key from the SE memory (342) and delivers the subscriber-specific security key to the media player (or link) application (344). The media player application uses the requested subscriber-specific security key to decrypt the license file to obtain the content decryption key for decrypting the content in the content file. The media player application presents the requested and decrypted content (323).

The example of FIG. 3 allows for the transfer DRM keys associated with content from one device to another, and thereby allow content to be played on the device to which the DRM keys were transferred.

FIG. 4 is a signal flow diagram of an example for maintaining DRM security keys for a subscriber when a new universal integrated circuit card is changed in subscriber equipment in an implementation of a subscriber-centric content digital rights management service. The elements, such as content server 140, MNO TSM 150, MNO OTA 240, MNO billing systems 250, device 160, device UICC 270 and secure element 280 that participate in process 400 are similar to the elements described with respect to FIG. 2 above, and the same description applies to the elements of FIG. 4.

In an example, a subscriber decides to upgrade their device by replacing the device or decides to sell or give their device to another user, which will require a change of the device UICC card 270 of the device 160. So, for purposes of proper billing and providing the appropriate services, in the process 400 of FIG. 4, the MNO billing system 250 is notified by a subscriber, an MNO customer service representative, or through some other form of notification, that the device UICC 270 is being changed. Prior to the change of the UICC occurring, the MNO billing system 250 notifies the MNO OTA 240 (at 410) that device 160 is having a change in subscriber status based on the device UICC 270 being changed. The MNO OTA 240 sends a notification (at 415) informing the MNO TSM 150 of the change in subscriber status based on an impending change of the device UICC 270. The MNO OTA 240 responds to the notification of a change in subscriber status by transmitting, at 417, over a wireless communication network to the current device UICC 270 and/or device secure element 280 instructions to delete the DRM keys from a memory controlled by the secure element 280. In response to the notification, the MNO TSM 150 accesses the database data records containing the assignment of the DRM key or keys to the CIN related to the current device UICC 270 and deletes identifiers related to the DRM keys from the data records corresponding to the CIN of the UICC 270.

Figure 5:
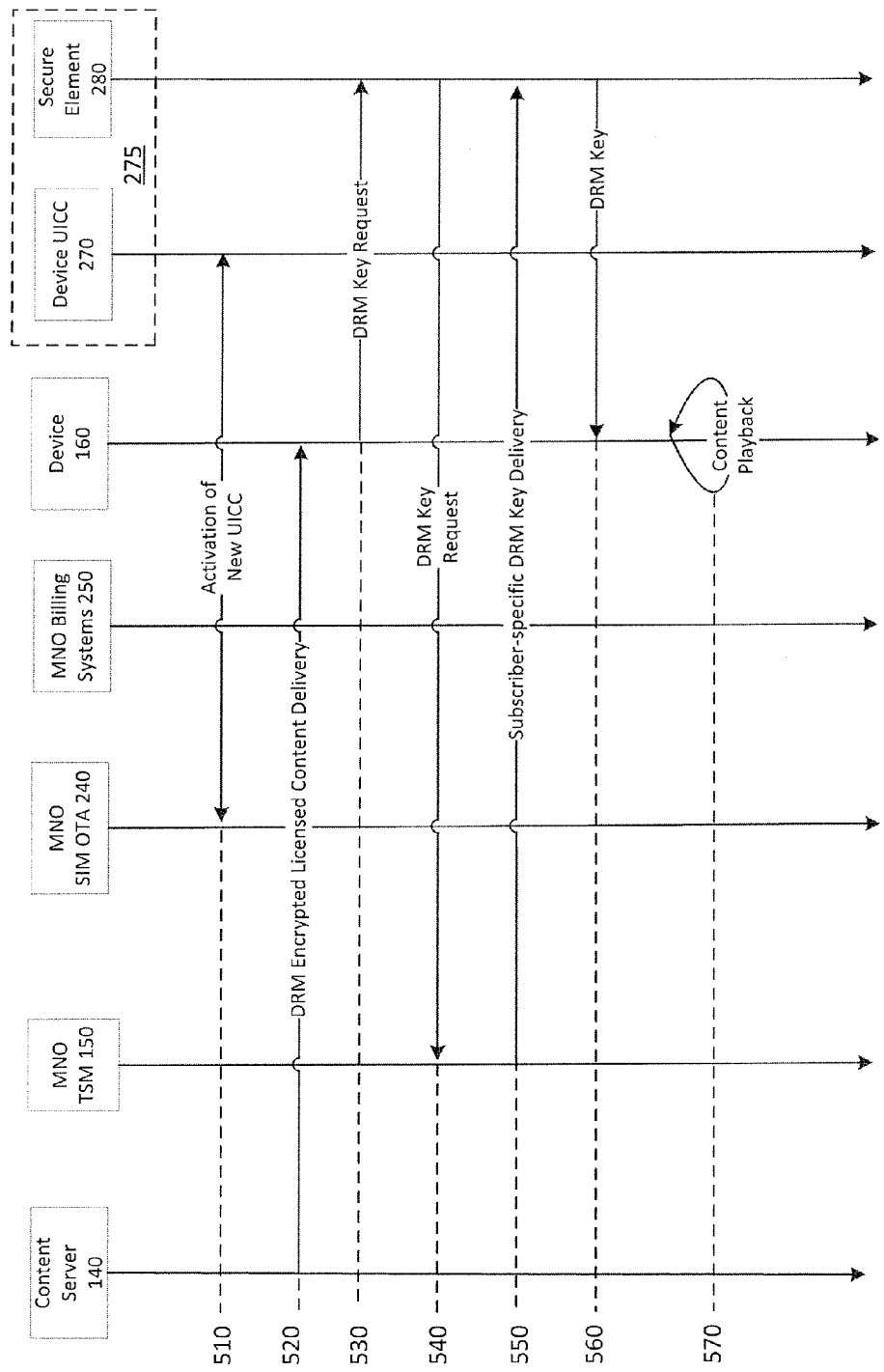
FIG. 5 is a signal flow diagram of an example for maintaining DRM security keys for a subscriber when subscriber equipment is activated in an implementation of a subscriber-centric content digital rights management service.

FIG. 5 is a signal flow diagram of an example for maintaining DRM security keys for a subscriber when subscriber equipment is changed and the UICC remains the same in an implementation of a subscriber-centric content digital rights management service.

When the device 160 is a new device that will be associated with a previously-provisioned device UICC 270, or a new device UICC 270 is to be installed in a device 160, the device UICC 270 is provisioned into the mobile operator network and activated for operation with the device 160 on the mobile network provided by the MNO, the MNO OTA 240 performs a known activation process (at 510) for configuring the device 160 to communicate over the mobile network provided by the MNO. The device subscriber or user may request content from a content server 140. The content server 140 delivers the licensed content, which in the present example, is DRM encrypted licensed content to the device 160 (at 520). For example, the delivered content may be contained in a content file including a file containing encrypted content and a license file as discussed above with respect to FIG. 3.

In response to a subscriber/user input requesting presentation of the delivered content, the device 160 processor launches a media playing application that determines the content is DRM encrypted content and generates a request (at 530) to the secure element 280 for the DRM keys associated with the DRM encrypted content to be presented. In response to the request from the media player application executing on the device 160 processor for DRM keys related to the associated DRM encrypted content, a processor in the secure element 280, according to the process described above with reference to FIG. 3, searches (not shown in FIG. 5) a secure element memory for the respective DRM keys associated with the DRM encrypted content. Since this is a new device or new device UICC, the DRM keys associated with the content may have not been allocated, or reallocated, and downloaded by the MNO TSM 150 to the device secure element 280.

As a result, the search of the secure element memory returns a negative search result to the secure element 280 processor. In response to the negative search results (as discussed above with respect to step 341 of FIG. 3), the secure element 280 processor launches a content key application (i.e. a link companion applet) that generates a request (at 540) for DRM keys that are specific to the subscriber account, and sends the request to the MNO TSM 150. The MNO TSM 150 responds to the request by providing the subscriber-specific DRM keys (at 550) associated with the DRM encrypted content to be presented to the device secure element 280. The device secure element 280 processor stores the subscriber-specific DRM keys in the secure element memory. The secure element memory may be a memory integrated with, or accessible to, the device UICC 270, and provides a copy of the subscriber-specific DRM key (at 560) to the media player application for decrypting the license keys in the license file associated with the DRM encrypted content to be presented. The media player application presents the decrypted DRM encrypted content on an output device of the device 160 (at 570).

Figure 6:
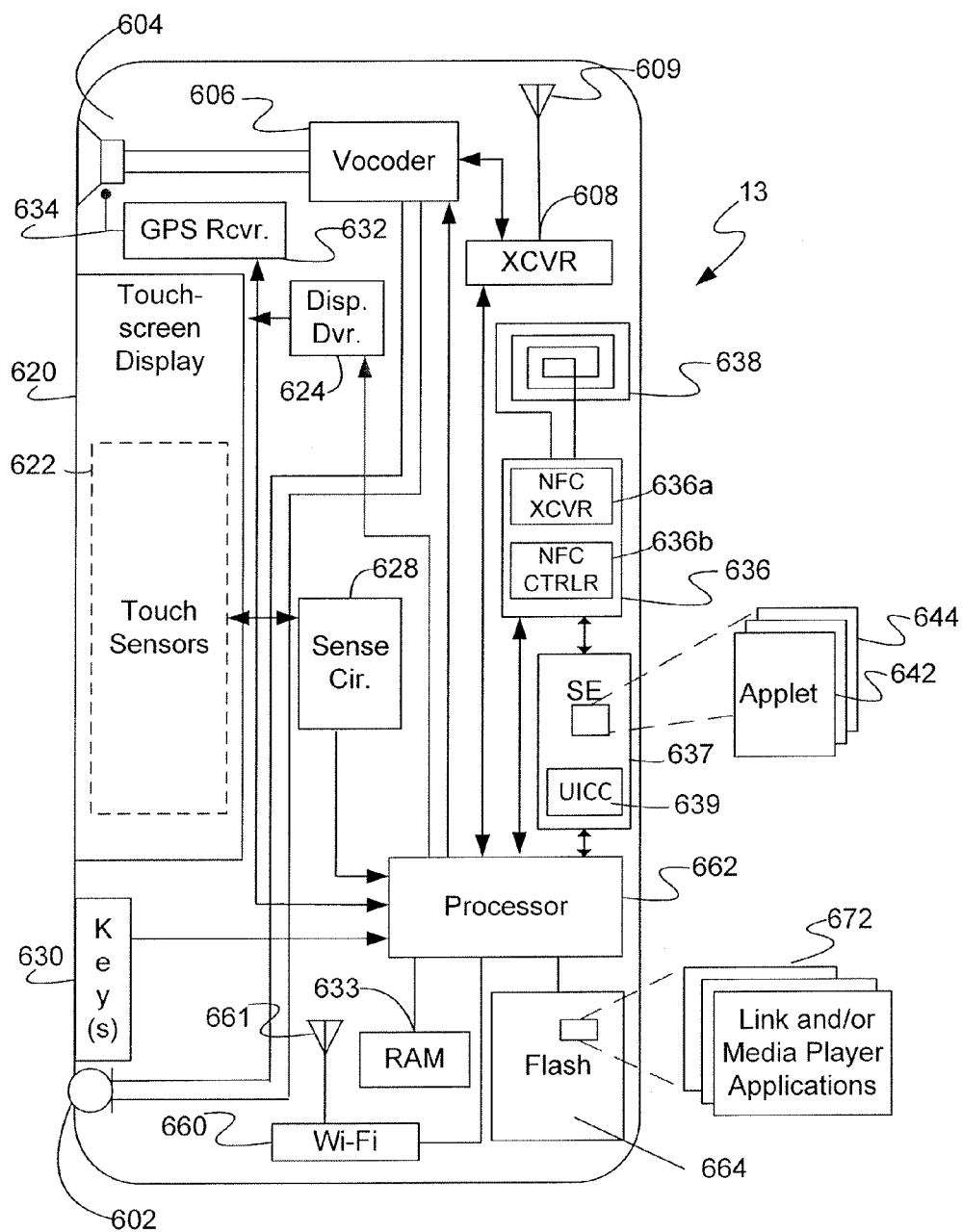
FIG. 6 provides a block diagram illustration of an exemplary mobile device usable with a subscriber-specific content digital rights management service.

FIG. 6 provides a block diagram illustration of the example of a mobile device 13 having a touch screen display for displaying content and receiving user input as (or as part of) the user interface. The present discussion encompasses a variety of types of mobile devices. The example in FIG. 6 represents a smartphone. It may be useful to consider the functional elements/aspects of an exemplary mobile device 13 at a high-level. Although the examples discussed thus far utilize data communications, a typical phone-type device, such as the smart phone example 13, also supports voice communications. Hence, in the example shown in FIG. 6, the mobile device 13 includes a microphone 602 for audio signal input and a speaker 604 for audio signal output. The microphone 602 and speaker 604 are communicatively coupled to a voice or audio encoder/decoder (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of content purchase or authentication communications. Increasingly, tablets and other types of mobile devices include similar elements to support audio and visual communication.

Also, as shown in FIG. 6, the mobile device 13 includes at least one digital transceiver (XCVR) 608, for digital wireless communications via a wide area wireless mobile communication network, although the mobile device 13 may include additional digital or analog transceivers (not shown). The transceiver 608 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 608 provides two-way wireless communication of information supporting communication in one or both directions of digitized audio signals, still image and/or video signals, web page information for display as well as web related inputs, and various types of mobile message communications to/from the mobile device 13.

Several of these types of communications through the transceiver 608 and a network, as discussed later, will relate to provisioning of the SE 637 by a remote server. On-line transaction related communications involving information obtained from the NFC enabled device 63, for example, often utilize Internet Protocol (IP) packet data transport utilizing the digital wireless transceiver (XCVR) 608 and over the air communications to and from base stations of the serving mobile network. Such communications may include specific account related data and security information from the mobile device 13.

In one example, the transceiver 608 also sends and receives a variety of signaling messages in support of various voice and data services provided by a network of a wireless service provider, to a user of mobile device 13 via the mobile communication network. Transceiver 608 connects through radio frequency (RF) send-and-receive amplifiers (not separately shown) to an antenna 609. Many modern mobile devices also support wireless local area network communications over Wi-Fi, instead of or in addition to data communications using the wide area mobile communication network. Hence, in the example of FIG. 6, for packet data communications, the exemplary mobile device 13 may also include a Wi-Fi transceiver 660 and associated antenna 661. The transceiver 660, for example, may provide two-way data transport for wireless communication with a wireless access point in a residence or enterprise that the user frequents or with any available hotspot offered in a public venue. Although communicating through a different network or networks, the transceiver 660 supports various types of data communications similar to the packet data communications supported via the mobile network transceiver 608, including communications related to the link application, link companion applet, and/or media player application functions.

The mobile device 13 further includes a processor 662, which serves as a programmable controller for mobile device 13 by configuring mobile device 13 to perform various operations, for example, in accordance with instructions or programming executable by processor 662. For example, such operations may include various general operations of the mobile device 13 as well as operations related to receiving and presenting DRM-protected content based on the use of subscriber-specific DRM keys associated with the DRM-protected content as described herein. A flash memory 664 is used to store, for example, programming (e.g. computer applications) or instructions for execution by the processor 662. For example, link applications or media player applications 672 may be stored in the flash memory 664 and may be executed by the processor 662. Depending on the type of device, the mobile device 13 stores and runs, an operating system through which specific applications may be run on the device. Examples of operating systems include Android, Apple iOS (I-Phone or iPad devices), Windows Mobile, RIM BlackBerry operating system, or the like. Flash memory 664 may also be used to store mobile configuration settings for different mobile applications or services executable at mobile device 13 (using processor 662). Mobile device 13 may also include a non-volatile random access memory (RAM) 633 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the link application and the processes for providing the subscriber-specific DRM-protected content delivery service, as described herein. Program aspects of the technology may be thought of as "products" or "articles of manufacture" typically in the form of executable code or process instructions and/or associated data that is stored on or embodied in a type of machine or processor readable medium.

A mobile device 13 may include a variety of different types of user interface elements. For discussion purposes, in the smart phone example shown in FIG. 6, the user interface elements of mobile device 13 include a touch screen display 620 (also referred to herein as "touch screen 620" or "display 620"). For output purposes, the touch screen 620 includes a display screen, such as a liquid crystal display (LCD) or the like. For input purposes, touch screen display 620 includes a plurality of touch sensors 622. Other interface elements may include a keypad including one or more keys 630. For example, the keypad may be implemented in hardware as a T9 or QWERTY keyboard of mobile device 13 and keys 630 may correspond to the physical keys of such a keyboard. Alternatively, keys 630 (and keyboard) of mobile device 13 may be implemented as "soft keys" of a virtual keyboard graphically represented in an appropriate arrangement via touch screen display 620. The soft keys presented on the touch screen display 620 may allow the user of mobile device 13 to invoke the same user interface functions as with the physical hardware keys. In some implementations, the microphone 602 and speaker 604 may be used as additional user interface elements, for audio input and output, including with respect to some functions related to the transaction processing and communication, as described herein. The different user interface elements may be used to navigate through the link application and/or media player application to select content for presentation, purchase content and to perform functions related to the licensed content.

For output, touch screen display 620 is used to present information (e.g., text, video, graphics or other visible digital media content) to the user of mobile device 13. Processor 662 controls visible display output on the LCD or other display element of the touch screen display 620 via a display driver 624, to present the various visible outputs to the device user.

In general, touch screen display 620 and touch sensors 622 (and one or more keys 630, if included) are used to provide the textual and graphical user interface for the mobile device 13. In an example, touch screen display 620 provides viewable content to the user at mobile device 13. Touch screen display 620 also enables the user to interact directly with the viewable content provided in the content display area, typically by touching the surface of the screen with a finger or an implement such as a stylus.

As shown in FIG. 6, the mobile device 13 also includes a sense circuit 628 coupled to touch sensors 622 for detecting the occurrence and relative location/position of each touch with respect to a content display area of touch screen display 620. In this example, sense circuit 628 is configured to provide processor 662 with touch-position information based on user input received via touch sensors 622 (e.g. a user interface element). In some implementations, processor 662 is configured to correlate the touch position information to specific content being displayed within the content display area on touch screen display 620. The touch-position information captured by sense circuit 628 and provided to processor 662 may include, but is not limited to, coordinates identifying the location of each detected touch with respect to the display area of touch screen display 620 and a timestamp corresponding to each detected touch position.

The user interface capabilities of the mobile device 13 provide output to and receive input from the user of the mobile device 13, for any of the various functions, operations or applications of the device. For example, programming (discussed more later) that configures the mobile device 13 to obtain and act on information presented on the touchscreen display 620 related to obtaining and presenting licensed content.

There is a variety of ways that a mobile device 13 may be configured to obtain information with respect to current location of the device. In our example, the mobile device 13 includes a global positioning satellite (GPS) receiver 632 and associated antenna 634. The mobile device 13 also has NFC communication capability in accordance with NFC technology and protocols, and includes an NFC sensor. The NFC sensor includes an NFC type radio frequency transceiver 636a and an NFC controller 636b, which is formed by an NFC chipset 636.

In order to run secure applications such as the link companion applet, access to content, routing to an URL site, such as a content server or license server, and the like, there is a Secure Element (SE) 637. In one example, the SE 637 is separate chip that includes a secure processor, a tamper-proof storage and a memory, and is configured to communicate with applications executing on the processor 662. The memory of the SE 637 contains applications (e.g., applets) that run inside the secure processor and provide secure subscriber-specific DRM keys stored in the memory to a link application or a media player application that has requested licensed content for presentation on an output device, such as a touchscreen display 620 or speaker 604. For example, there may be at least one applet 642 for processing of subscriber-specific DRM keys, such as the above-referenced link companion applet; and at least one applet 644 for processing of at least one type of communication not related to subscriber-specific DRM keys, such as a subscriber authentication to a content provider for purchase of content, or to a link application 672 executing on the mobile device processor 662.

For example, the applications that run on the SE typically run on a Javacard operating system. The SE may include various account information, such as account number, user identification, a personal identification number (PIN), or the like for user verification and possibly account balance and/or transaction record information. The SE may be used to decode credentials of devices. In various examples, the secure element may be part a UICC or a separate secure element like a secure digital (SD) memory card used for storing and accessing applications and data, such as secure subscriber-specific DRM keys, in a secure manner. The logic implemented by the processor 662 of the mobile device 13 configures the processor 662 to control various functions as implemented by the mobile device 13. The logic for a processor may be implemented in a variety of ways, but in our example, the processor logic is implemented by programming for execution by the processor 662.

As shown by the above discussion, functions relating to the enhanced content delivery experience for the subscriber-specific DRM-protected content delivery service, via a graphical user interface of a mobile device may be implemented on computers connected for data communication via the components of a packet data network, operating as an mobile device and/or as a content presentation appliance, such as a television, tablet or other device, as shown in elements 120, 140 or 170 of FIG. 1. Although special purpose devices may be used, such devices also may be implemented using one or more hardware platforms intended to represent a general class of data processing device commonly used to run "server" programming so as to implement the content delivery and license delivery functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the subscriber-specific DRM-protected content delivery service. The software code is executable by the general-purpose computer that functions as the license or content server and/or that functions as an end user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for subscriber-specific DRM-protected content delivery service, in essentially the manner performed in the implementations discussed and illustrated herein.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer, other type of media device (e.g. set-top box, gaming console, smart DVD player, smart television, or a terminal device, although the computer of FIG. 8 may also act as a server if appropriately programmed. Each of the devices illustrated in FIG. 8 may be configured to connect to a data network (e.g. the Internet) or a cellular communication network. It is believed that the general structure and general operation of such equipment as shown in FIGS. 7 and 8 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC, set-top box, gaming console, other media devices, or tablet computer, similarly includes a data communication interface CPU, main memory and one or more mass storage devices for storing user data and the various executable programs (see FIG. 8). A media device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a gaming control, motion or gesture detector, a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of subscriber-specific DRM-protected content delivery service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the content provider into a computer platform that will act as the content server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the servers, mobile device link applications, secure element applets, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method, comprising:
   receiving, by a processor of a mobile device, a request to present content on an output device of the mobile device;
   determining that the requested content requires a subscriber-specific security key to be presented on the output device, wherein the subscriber-specific security key is a digital rights management key assigned by a mobile network operator to a subscriber of the mobile device and is associated with the requested content;
   accessing, by a secure element processor, a secure element embedded within the mobile device that includes a secure element memory of the mobile device having stored therein a plurality of subscriber-specific security keys,
   wherein the secure element processor operates independently from the processor of the mobile device to provide access to secured or personal information requested by the processor of the mobile device from the secure element memory,
   wherein the secure element memory is protected by one or more security layers implementing encryption techniques to restrict access to the secure element memory to the secure element processor, and wherein the secure element memory further includes an application that when executed by the secure element processor, obtains the subscriber-specific security key or secured information for the processor of the mobile device;

analyzing, by the secure element processor, the plurality of subscriber-specific security keys stored in the secure element memory;

retrieving, based on the results of the analysis, the subscriber-specific security key of the plurality of subscriber-specific security keys that is associated with the requested content;

determining, by the processor of the mobile device and based on the subscriber-specific security key, a content decryption key; and presenting, by a media player application executed by the processor of the mobile device and using the content decryption key, the requested content through the output device of the mobile device.

2. The method of claim 1, wherein in response to the analysis failing to identify at least one of the plurality of subscriber-specific security keys stored in the secure element memory as the subscriber-specific security key that is associated with the requested content, the retrieving further comprises:
launching, by the secure element processor in the secure element of the mobile device, a content key application for retrieving subscriber-specific security keys associated with the requested content.

3. The method of claim 2, further comprising:
in response to control signals from execution of the content key application by the secure element processor, transmitting a request for subscriber-specific security keys related to the content to a server associated with the mobile device;

receiving the subscriber-specific security keys from the server;

storing the received subscriber-specific security keys in the secure element memory; and sending the received subscriber-specific security keys to the media player application executing on the mobile device processor.

4. The method of claim 3, further comprising:
executing a bearer independent protocol to receive the requested subscriber-specific security keys related to the content.

5. The method of claim 2, wherein the content key application launched from the secure element is a secure application associated with the media player application executing on the mobile device processor.

6. The method of claim 1, wherein in response to the analysis identifying at least one of the plurality of subscriber-specific security keys stored in the secure element memory as being associated with the requested content, the retrieving comprises:
obtaining the identified subscriber-specific security key associated with the requested content from the secure element memory; and
returning the obtained, identified subscriber-specific security key to the mobile device processor.

7. The method of claim 1, wherein the subscriber-specific security keys are transferrable from the mobile device to another media device by inserting the secure element memory into the other media device.

8. The method of claim 1, further comprising:
in response to completing, by the mobile device processor, a purchase of content from a content provider, establishing a communication connection with a mobile network operator trusted service manager; and receiving, via the communication connection, a subscriber-specific security key associated with the purchased content from the mobile network operator trusted service manager.

9. The method of claim 1, further comprising:
receiving the requested content via a cellular transceiver from a mobile network operator via a communication channel established by the mobile device processor with a wireless communication network.

10. A device, comprising:
a wireless mobile network transceiver;
a user interface element;
an output device, wherein the output device comprises at least one of a display device or a speaker;
a device data storage storing a plurality of applications including a media player application;
a device processor coupled to the transceiver and the device data storage; and
a secure element coupled to the transceiver and the device processor, the secure element including a secure element processor and a secure element data storage,
wherein the secure element data storage is protected by one or more security layers configured to implement encryption techniques on the secure element processor to prevent access by the device processor to the secure element data storage, and
wherein the secure element data storage comprises an application that when executed by the secure element processor, obtains secure information;
wherein the device processor is configured to execute the applications stored in the device data storage and to control the device to perform functions, including functions to:
receive a request to present content on the output device from the user interface element;
determine the requested content requires a subscriber-specific security key to be presented, wherein the subscriber-specific security key is a digital rights management key associated with both the requested content and a subscriber of the device;
send a request to the secure element processor for the subscriber-specific security key;
receive at least one subscriber-specific security key from the secure element processor in response to the request;
present, by execution of the media player application using the received subscriber-specific security key, the requested content on the output device; and
wherein the secure element processor is configured to interact with the device processor to control the device to perform functions, including functions to:
in response to the request from the device processor, access the secure element data storage having stored therein a plurality of subscriber-specific security keys;
analyze the plurality of subscriber-specific security keys stored in the secure element data storage; and
send, based on results of the analysis, a subscriber-specific security key associated with the requested content to the media player application executing on the device processor.

11. The device of claim 10, wherein the secure element processor is further configured to control the device to perform functions, including functions to:
in response to the analysis failing to identify one of the plurality of subscriber-specific security keys corresponding to the requested content, launch a content key application for retrieving subscriber-specific security keys associated with the requested content;
receive the subscriber-specific security keys from a server;
store the subscriber-specific security keys in the secure element data storage; and
send the subscriber-specific security keys to the media player application executing on the device processor.

12. The device of claim 11, wherein the device processor is further configured to control the device to perform functions, including functions to:
in response to control signals from execution of the content key application by the secure element processor, transmit a request for subscriber-specific security keys related to the content to the server; and
execute a bearer independent protocol to receive the requested subscriber-specific security keys related to the content.

13. The device of claim 11, wherein the content key application launched from the secure element is a secure application associated with the media player application executing on the device processor.

14. The device of claim 10, wherein the requested subscriber-specific security keys are stored on a subscriber identifying module memory accessible by only the secure element processor.

15. The device of claim 11, wherein the requested content is stored on the device data storage.

16. A non-transitory, machine-readable medium comprising instructions stored therein, which when executed by a machine, cause the machine to perform operations comprising:
receiving a request to present content via an output device of a mobile device;
determining that the requested content requires a subscriber-specific security key to be presented on the output device, wherein the subscriber-specific security key is a digital rights management key assigned by a mobile network operator to a subscriber of the mobile device and is associated with the requested content;
accessing, a secure element embedded within the mobile device that includes a secure element memory of the mobile device having stored therein a plurality of subscriber-specific security keys,
wherein the secure element memory is protected by one or more security layers implementing encryption techniques to restrict access to the secure element memory, and
wherein the secure element memory further includes a secure application that when executed by a secure element processor, obtains at least one of a plurality of subscriber-specific security keys;
analyzing, by the secure element processor, the plurality of subscriber-specific security keys stored in the secure element memory;
retrieving, based on the results of the analysis, the subscriber-specific security key of the plurality of subscriber-specific security keys that is associated with the requested content;
determining, based on the subscriber-specific security key, a content decryption key; and
presenting, using the content decryption key, the content through the output device of the mobile device.

17. The non-transitory machine-readable medium of claim 16, wherein in response to the analysis failing to identify at least one of the plurality of subscriber-specific security keys stored in the secure element memory as the subscriber-specific security key associated with the requested content, the instructions causing the machine to perform operations further comprising:
launching a content key application for retrieving subscriber-specific security keys associated with the requested content.

18. The non-transitory machine-readable medium of claim 17, the instructions causing the machine to perform operations further comprising:
in response to control signals from execution of the content key application by the secure element processor, transmitting a request for subscriber-specific security keys related to the content to a server associated with the mobile device;
receiving the subscriber-specific security keys from the server;
storing the received subscriber-specific security keys in the secure element memory; and
sending the received subscriber-specific security keys to a media player application executing on the mobile device.

19. The non-transitory machine-readable medium of claim 18, the instructions causing the machine to perform operations further comprising:
executing a bearer independent protocol to receive the requested subscriber-specific security keys related to the requested content.

20. The non-transitory machine-readable medium of claim 17, wherein the content key application launched from the secure element is a secure application associated with a media player application executing on the mobile device.

* * * * *